United States Patent [19]
Poisner et al.

[11] Patent Number: 5,983,354
[45] Date of Patent: Nov. 9, 1999

[54] METHOD AND APPARATUS FOR INDICATION WHEN A BUS MASTER IS COMMUNICATING WITH MEMORY

[75] Inventors: David I. Poisner, Folsom; Nima Homayoun, Sant Clara; Sung Soo Cho, Sunnyvale, all of Calif.

[73] Assignee: Intel Corporation, Santa Clara, Calif.

[21] Appl. No.: 08/984,319

[22] Filed: Dec. 3, 1997

[51] Int. Cl.[6] .............................. G06F 1/32; G06F 12/00
[52] U.S. Cl. ........................ 713/320; 713/324; 710/129
[58] Field of Search .................................... 713/320, 324; 710/129, 130, 22, 128; 711/141

[56] References Cited

U.S. PATENT DOCUMENTS

| | | | |
|---|---|---|---|
| 5,623,697 | 4/1997 | Bland et al. | 710/22 |
| 5,778,425 | 7/1998 | Shigeeda | 711/122 |
| 5,835,742 | 11/1998 | James et al. | 710/130 |

*Primary Examiner*—Gopal C. Ray
*Attorney, Agent, or Firm*—David J. Kaplan

[57] ABSTRACT

A method and apparatus for indicating when a device in a computer system is communicating with memory. Information is communicated between the device and memory in a manner that bypasses a bus. A side-band signal that indicates that this communication is transpiring is sent to a second device connected to the second bus. In response to this side-band signal, a bit in a register of the second device is set to a value that is then communicated by way of the second bus.

20 Claims, 2 Drawing Sheets

METHOD AND APPARATUS FOR INDICATION WHEN A BUS MASTER IS COMMUNICATING WITH MEMORY

FIELD OF THE INVENTION

The present invention relates to computer systems and more particularly to a method and apparatus for indicating when a bus master is communicating with memory of the computer system.

BACKGROUND OF THE INVENTION

As computer systems get faster and more powerful they tend to consume more electricity. This makes operation of these computer systems more expensive. In addition, the increase in energy consumption of these computers tends to result in an increase in heat generated by the computers. If not properly dissipated, this heat can impede operation or even destroy the computer. Therefore, energy consumption and heat dissipation is a concern in the design of most computer systems.

Mobile computer systems represent a particular concern to system designers because mobile computer systems are typically powered by a battery, significantly limiting the amount of electrical energy available to the computer. In addition, because mobile computer systems must remain lightweight to be attractive to the consumer, the range of heat dissipation devices available to the system designer for cooling the computer is severely limited by the weight constraints. Mobile computers include, for example, laptop, notebook, sub-notebook, handheld, and other portable computers and personal data assistants.

A computer system contains one or more processors along with other electronic devices that communicate with the processor. A processor is typically considered to be the "brain" of the computer system, and generally consumes the most amount of energy. Because the processor typically consumes the most energy of all the devices in a system, most energy consumption reduction efforts focus on the processor. One method of reducing energy consumption is to place the processor into a low power state during which time one or more of the many functions performed by the processor are essentially disabled. Each function performed by the processor consumes some portion of the total energy consumed by the whole, so by disabling one or more functions of the processor, the overall energy consumption of the processor is reduced. A low power state is also referred to as sleep, deep sleep, throttle, and power-down.

Before disabling any functions of the processor, however, it is first determined whether or not the function being disabled is needed by any of the other electronic devices of the computer system. If the function is needed, then that function cannot be disabled. For example, one function performed by the processor is making sure that the information stored in the processor's local memory, or cache, is consistent with the information stored in the main memory of the computer system. Ensuring consistency between data in the cache and data in other memory locations is known as maintaining cache coherency. Some low power states are non-coherent low power states in that they don't support cache coherency. If one attempted to place the processor into a low power state that doesn't support cache coherency, the system would need to first check to ensure that none of the other electronic devices are communicating with main memory at the time.

If any of the devices are communicating with main memory when the processor attempts to transition to a non-coherent low power state, there exists the danger that the device will change data stored in main memory, thereby making the data inconsistent with copies of the data stored in the processor's cache. To eliminate this danger, the transition to a low power state is prevented if it is determined that an electronic device is in communication with main memory. Electronic devices that can initiate communication with main memory are called bus masters because they are capable of mastering, or gaining ownership of, the bus or buses necessary to communicate with slave or target devices such as memory.

To determine whether or not any bus masters are communicating with main memory, the processor must poll, or read information from, the masters to determine the status of the masters. If a master is communicating with main memory, or other memory location in the computer system, the master, or other control device, notifies the processor of this activity in response to being polled. Unfortunately, as more masters are added to the computer system, the processor must take the time to poll more devices before determining whether or not it is safe to transition to a low power state that fails to support cache coherency. This delays the transition to the low power state and increases the amount of communication between devices in the computer system. As a result, power consumption increases, as does the burden on software to coordinate all of this polling activity.

SUMMARY OF THE INVENTION

A method and apparatus is described for indicating when a device in a computer system is communicating with memory. Information is communicated between the device and memory in a manner that bypasses a bus. A side-band signal that indicates that the device is communicating with memory is sent to a second device connected to the bus. In response to this side-band signal, a bit in a register of the second device is set to a value that is then communicated by way of the bus.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus is described for indicating when a bus master in a computer system is communicating with memory. When a bus master, such as an advanced graphics port (AGP) device, is communicating with the main memory of a computer system (i.e. the device has requested and gained access to the main memory), it sends a side-band signal that indicates this activity to a power manager coupled to a peripheral component interconnect (PCI) bus. The power manager is a block of power management circuitry contained within a secondary bridge coupled to the PCI bus.

The power manager comprises a register that includes a status bit. The value of this status bit indicates whether or not a bus master coupled to the PCI bus is communicating on the PCI bus. When the power manager receives the side-band signal from the AGP device, the status bit is set to a value that indicates that a device (the AGP device for this embodiment) is communicating with main memory.

Before the processor of the computer system transitions to a non-coherent low power state, the processor polls the power manager to determine if any masters are in communication with the main memory. In response, the power manager communicates the value of the status bit to the processor, indicating that a master is communicating with main memory. The transition to the low power state is then prevented.

Note that the status bit in the power manager is intended to indicate the activity of bus masters coupled to the PCI bus, not the activity of devices coupled to other buses, such as the AGP device. By sending the side-band signal to the power manager from the AGP device in accordance with an embodiment of the present invention, however, the same status bit in the power manager that indicates the activity of PCI devices is used to indicate the activity of the AGP device as well. In this manner, it is not necessary for the processor to separately poll the AGP device to determine if the AGP device is in communication with the main memory before the processor transitions to a low power state. Instead, the processor need only poll the power manager to receive information about the activity of the PCI devices along with the AGP device. As a result, the amount of polling by the processor is reduced, thereby reducing power consumption and the burden on software to coordinate all of this polling activity.

A more detailed description of the present invention, including various configurations and implementations in accordance with alternate embodiments of the present invention, is provided below.

Figure 1:
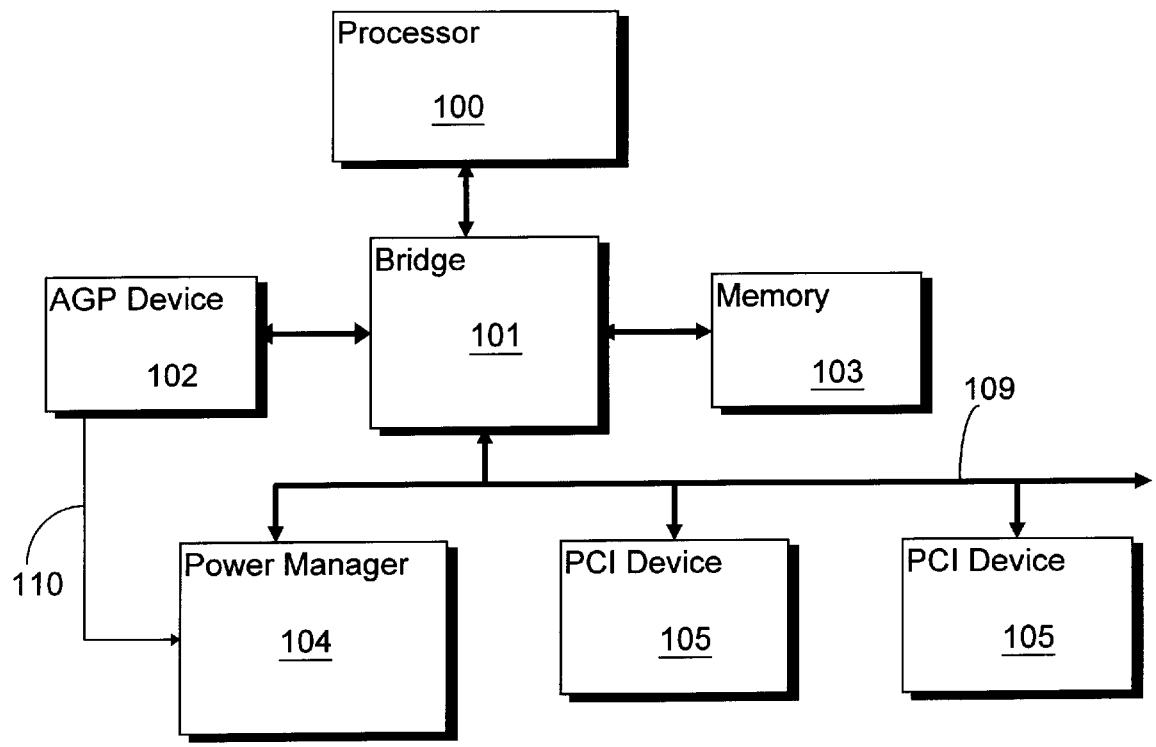
FIG. 1 is a computer system formed in accordance with an embodiment of the present invention.

FIG. 1 is a computer system formed in accordance with an embodiment of the present invention in which bridge 101 couples processor 100, AGP device 102, memory 103, and PCI bus 109 together. Bridge 101 enables communication between the devices and buses to which it is coupled. Power manager 104 and PCI devices 105 are coupled to bridge 101 via PCI bus 109. AGP device 102 is coupled to power manager 104 by side-band signal line 110. A side-band signal line is a direct and dedicated electrical interconnect that bypasses the bridges of a computer system and directly communicates signals between the devices to which it is coupled. The signals communicated via side-band signal lines are referred to as side-band signals.

Because bridge 101 of FIG. 1 is the bridge closest to processor 100, bridge 101 is referred to as the primary bridge of the system. For one embodiment of the present invention, power manager 104 comprises power management circuitry and is included within a second bridge of the computer system that couples PCI bus 109 to other buses and devices of the computer system (not shown). Because this second bridge is further from processor 100 than primary bridge 101, this second bridge is referred to as the secondary bridge of the system.

In accordance with one embodiment of the present invention, processor 100 comprises a cache. Processor 100 and bridge 101 work together to ensure that if any other devices of the computer system, particularly bus masters such as AGP device 102 or PCI devices 105, communicate with memory 103, data stored in the cache of processor 100 remains coherent with data stored in memory 103.

For example, referring to FIG. 1, if AGP device 102 writes data to a particular address within memory 103, and the cache within processor 100 contains data with the same address, the data in the cache is invalidated. In this manner the processor is forced to retrieve the updated data from memory 103 rather than use the old data from its own cache.

For another embodiment, other bus masters, including devices coupled to the PCI bus or secondary buses coupled to a secondary bridge, communicate with the memory of the computer system. For an alternate embodiment of the present invention, the computer system comprises multiple processors, each requiring cache coherency with each other and with the memory. For one embodiment, the memory is the main memory or system memory of the computer system. For other embodiments of the present invention, alternative buses and bridge structures are implemented. Bus masters include, for example, audio capture and playback devices, video capture and playback devices, digital signal processors, and control devices.

In accordance with one embodiment of the present invention, AGP device 102 of FIG. 1 requests access to memory 103. AGP device 102 then sends a side-band signal, called BUSY#, along side-band signal line 110 to power manager 104. The side-band signal BUSY# is active as long as AGP device 102 is communicating with memory 103. This means that as long as transactions or communication between AGP device 102 and memory 103 take place, the side-band signal BUSY# is driven to an active state, which is a logical "0" in this case. Alternatively, the side-band signal is active-high, meaning the signal is driven to a logical "1". For an alternate embodiment, side-band signal BUSY# is active as long as the AGP device has additional transactions pending. For another embodiment, side-band signal BUSY# comprises one or more finite pulses (binary signals) to indicate AGP communication with memory, and one or more finite pulses are again sent from the AGP device along the side-band signal line to indicate the completion of this communication. In accordance with another embodiment, the side-band signal comprises two or more parallel signals sent along two or more side-band signal lines.

Figure 2:
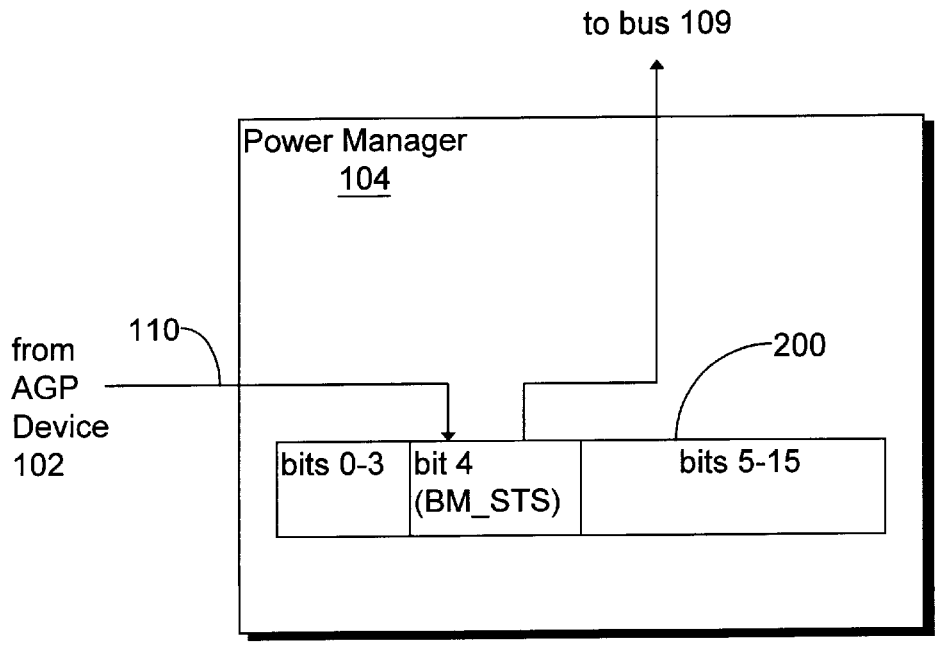
FIG. 2 is a power manager formed in accordance with an embodiment of the present invention.

FIG. 2 is one embodiment of the power manager 104 of FIG. 1 in which side-band signal line 110 enters power manager 104 and is coupled to status register 200, which is coupled to PCI bus 109. Power manager 104 is formed in accordance with the Advanced Configuration and Power Interface ("ACPI") Specification, Revision 1.0, published Dec. 22, 1996, by Intel Corporation, Microsoft Corporation, and Toshiba Corporation. Status register 200 is a PM1 status register as defined in the ACPI specification, and bit 4 of status register 200 is the bus master status bit (BM_STS). The bus master status bit reflects bus master activity of any bus master that can create incoherence between data in a processor cache and the rest of the memory system for a processor in a low power state when the bus master performs a memory transaction.

When power manager 104 of FIG. 2 receives the BUSY# side-band signal along side-band signal line 110 from AGP device 102, bus master status bit 4 of status register 200 is set to a logical "0". Conversely, when the side-band signal indicates that AGP device 102 is no longer communicating with memory 103 (and no additional transactions are pending, in accordance with an alternate embodiment) bus master status bit 4 is reset to a logical "1". Alternatively, any other type of bus master status bit or plurality of bits is set to the appropriate value to indicate bus master activity.

The ACPI specification defines four low power states known as C0, C1, C2, and C3, and these states are primarily for processor power state control. C0 is the normal working state. A processor in a C1 power state is in a low power state in which the processor is able to maintain cache coherency with main memory. A processor in a C2 power state is in a lower power state than the C1 state, and is also able to maintain cache coherency with main memory. A processor in a C3 power state is in a lower power state than the C2 state, and is unable to maintain cache coherency with main memory.

Because a processor in the C3 low power state does not support cache coherency, there should not be any communication between the bus masters and main memory while the processor is in the C3 low power state. This may be accomplished by ensuring that no devices are communicating with main memory before the processor transitions to the C3 state, and when the processor is in the C3 state, ensuring that the processor transitions back to the C0 state upon a request by a bus master device for access to main memory.

Referring back to FIGS. 1 and 2, to ensure that no devices are communicating with main memory before the processor transitions to the C3 low power state, processor 100 polls power manager 104 for bus master status information by reading bit 4 of the status register. If this bit indicates that a bus master, such as AGP device 102 or one of PCI devices 105, is communicating with memory, then the processor does not transition to the C3 low power state. For one embodiment of the present invention, the processor stays in the C0 state. For another embodiment, the processor instead transitions to the C2 or other low power state that is capable of maintaining cache coherency with the main memory of the system, after aborting the transition to the C3 state.

Referring again to FIG. 1, in accordance with an embodiment of the present invention, AGP device 102 communicates with memory 103 via bridge 101, bypassing PCI bus 109. Note that absent the side-band signal communication between AGP device 102 and power manager 104, power manager 104 has little or no insight into communication between AGP device 102 and memory 103 because this communication bypasses bus 109 to which power manager 104 is coupled. As a result, when processor 100 polls power manager 104 to get information on the status of bus master activity, the activity of AGP device 102 would not be captured were it not for the side-band signal. Absent the side-band signal, processor 100 would need to separately poll AGP device 102 to determine its status. By including side-band signal line 110, and setting the bus master status bit to represent the side-band signal from AGP device 102, as well as PCI devices 105, processor 100 need only poll power manager 104 to get information on the activity of all the bus masters in this computer system. In this manner, the processor need not expend the energy and time necessary to separately poll AGP device 102 to determine its communication status.

Figure 3:
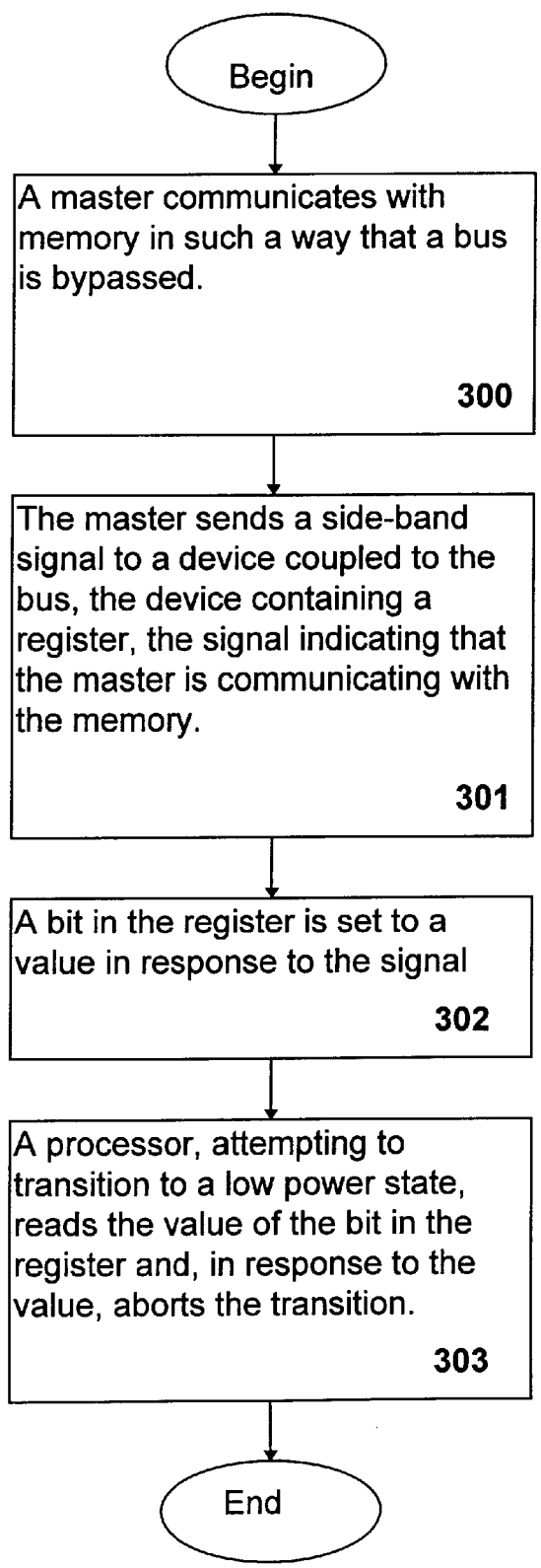
FIG. 3 is a flow chart showing a method of the present invention.

FIG. 3 is a flow chart showing a method of the present invention. At step 300 a bus master communicates with memory in a computer system in such a way that a bus is bypassed. For one embodiment, the memory is the main memory of the computer system. For another embodiment of the present invention, this memory is another type of memory with which the cache of a processor of the computer system remains coherent for proper operation of the computer system. For example, the memory may be the cache of an alternate processor in a multiprocessor system. In accordance with one embodiment of the present invention, the bus master is an AGP device.

At step 301 of FIG. 3, the bus master sends a side-band signal to a device coupled to the bus. The device contains a register, and the side-band signal indicates that the master is communicating with memory. For one embodiment, this side-band signal is a simple one bit binary value that is driven high or low on a side-band signal line depending on the status of the master to which the signal line is coupled. For an alternate embodiment, the side-band signal is a more complex signal comprising one or more bits sent along one or more side-band signal lines during at least a portion of the communication between the master and memory. For another embodiment, the side-band signal is sent whenever the master has a memory transaction pending.

At step 302 of FIG. 3, a bit in the register is set to a value in response to the side-band signal. For one embodiment, this bit is a status bit that indicates the status of the master with respect to communication or pending communication with memory. For an alternate embodiment of the present invention, two or more bits are set in response to the side-band signal, the bits collectively indicating the status of the master.

Finally, at step 303 of FIG. 3, a processor attempting to transition to a low power state reads the value of the bit in the register and, in response to reading the bit, aborts the transition. For one embodiment of the present invention, the low power state is a state in which the processor is unable to maintain cache coherency, such as the C3 state of an ACPI compliant system. In accordance with an alternate embodiment of the present invention, the processor instead transitions to an alternate low power state in which the processor is able to maintain cache coherency with memory, such as the C2 state of an ACPI compliant system.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of indicating when a first device is communicating with a memory in a computer system, the method comprising the steps of:
   a. communicating information between the first device and the memory in a manner that bypasses a bus;
   b. sending a side-band signal to a second device coupled to the bus indicating that the first device is communicating with the memory;
   c. setting at least one bit in a register in the second device to a value in response to the signal; and
   d. communicating the value of the bit via the bus.

2. The method of claim 1, wherein the step of communicating the value of the bit comprises communicating the value of the bit to a processor.

3. The method of claim 2, wherein the processor aborts a transition to a first low power state in response to receiving the value of the bit.

4. The method of claim 3, wherein the step of setting comprises setting a BM_STS bit in a PM1 status register, and the processor aborts a transition to a C3 state in an Advanced Configuration and Power Interface (ACPI) compliant system.

5. The method of claim 3, wherein the processor transitions to a second low power state in response to receiving the value of the bit, the second low power state maintaining cache coherency with the memory.

6. The method of claim 1, wherein the step of communicating information comprises communicating information with main memory of the computer system and the second device is a secondary bridge comprising a power manager.

7. The method of claim 6, wherein the first device communicates with memory via a primary bridge, and the bus is a peripheral component interconnect (PCI) bus of the computer system.

8. The method of claim 1, wherein the first device is an advanced graphics port (AGP) device, and the memory is a main memory of the computer system.

9. A method of transitioning a processor to a low power state, comprising the steps of:
   a. sending a side-band signal from a bus master to a device coupled to a bus, the signal indicating whether or not the master is in communication with a memory, the communication bypassing the bus;
   b. setting at least one bit in a register in the device to a value representing the side-band signal;
   c. communicating the value of the bit to the processor via the bus; and
   d. transitioning the processor to a first low power state if the value of the bit indicates that the master is not communicating with the memory.

10. The method of claim 9, further comprising the step of transitioning the processor to a second low power state if the value of the bit indicates that the master is communicating with memory, the first low power state failing to support cache coherency and the second low power state supporting cache coherency.

11. The method of claim 9, wherein the master is an advanced graphics port (AGP) device, the bus is a peripheral component interconnect (PCI) bus, the memory is a main memory, and the device is a secondary bridge comprising power management circuitry.

12. The method of claim 11, wherein the communication between the master and the main memory is done via a primary bridge, and the step of communicating the value of the bit to the processor is done via the primary bridge.

13. The method of claim 9, wherein the step of setting comprises setting a BM_STS bit in a PM1 status register, and the low power state is a C3 state in an Advanced Configuration and Power Interface (ACPI) compliant system.

14. A computer system, comprising:

a first device to communicate with a memory in a manner that bypasses a bus, and to output a side-band signal indicating when the first device is communicating with the memory;

a side-band signal line, coupled to the first device, to communicate the side-band signal;

a second device, coupled to the side-band signal line and to the bus, the second device comprising a register bit to represent the side-band signal; and a processor to read the register bit via the bus.

15. The computer system of claim 14, further comprising a primary bridge to couple the first device with the memory and to couple the bus to the processor.

16. The computer system of claim 15, wherein the first device is an advanced graphics port (AGP) device, the memory is main memory, and the second device is a secondary bridge.

17. The computer system of claim 14, wherein the first device is an advanced graphics port (AGP) device, the memory is main memory, and the second device is a secondary bridge.

18. The computer system of claim 14, wherein the processor is operable to transition to a first low power state if the value of the bit indicates that the first device is not communicating with the memory, the first low power state rendering the processor unable to maintain cache coherency with the memory.

19. The computer system of claim 18, wherein the processor is operable to transition to a second low power state if the value of the bit indicates that the first device is communicating with the memory, the second low power state maintaining cache coherency with the memory.

20. The computer system of claim 18, wherein the first low power state is a C3 state in an Advanced Configuration and Power Interface (ACPI) compliant system.

* * * * *